United States Patent
Okita et al.

(10) Patent No.: US 7,902,780 B2
(45) Date of Patent: Mar. 8, 2011

(54) INERTIA ESTIMATING CONTROLLER AND CONTROL SYSTEM

(75) Inventors: Tadashi Okita, Minamitsuru-gun (JP); Yukio Toyozawa, Minamitsuru-gun (JP); Naoto Sonoda, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 0 days.

(21) Appl. No.: 12/576,262

(22) Filed: Oct. 9, 2009

(65) Prior Publication Data

US 2010/0148714 A1 Jun. 17, 2010

(30) Foreign Application Priority Data

Dec. 16, 2008 (JP) ................. 2008-320088

(51) Int. Cl.
*H02P 7/00* (2006.01)
(52) U.S. Cl. ...................... 318/432; 318/632
(58) Field of Classification Search .......... 318/432, 318/632, 648, 400.15; 702/33, 41
See application file for complete search history.

(56) References Cited

U.S. PATENT DOCUMENTS

| | | | | |
|---|---|---|---|---|
| 5,659,480 | A | * | 8/1997 | Anderson et al. ............. 700/186 |
| 6,600,979 | B1 | * | 7/2003 | Kumar et al. ................... 701/20 |
| 6,736,018 | B2 | * | 5/2004 | Terada ........................ 73/862.27 |
| 7,289,915 | B2 | * | 10/2007 | Ide .................................. 702/41 |
| 2007/0143040 | A1 | | 6/2007 | Ide |
| 2008/0017601 | A1 | * | 1/2008 | Neupert et al. ............... 212/270 |
| 2009/0063058 | A1 | * | 3/2009 | Rehm et al. ..................... 702/41 |

FOREIGN PATENT DOCUMENTS

| | | |
|---|---|---|
| JP | 01-218389 | 8/1989 |
| JP | 6-82346 | 3/1994 |
| JP | 8-140386 | 5/1996 |
| JP | 8-331880 | 12/1996 |
| JP | 2007-143224 | 6/2007 |
| JP | 2007-156699 | 6/2007 |
| JP | 2008-92657 | 4/2008 |

OTHER PUBLICATIONS

A Japanese Notice of Reasons for Rejection mailed Apr. 13, 2010 issued in Japanese Application No. 2008-320088 (including a partial translation thereof).
German Office Action mailed Oct. 14, 2010 issued in German Application No. 10 2009 058 443.9 (including an English-language translation thereof).

* cited by examiner

*Primary Examiner* — Rina I Duda
(74) *Attorney, Agent, or Firm* — Drinker Biddle & Reath LLP

(57) ABSTRACT

A controller and a control system capable of estimating inertia of an article to be driven in a short period of time, with a small operation range of an electric motor. The controller for the motor has an inertia estimating part which includes a sine-wave command generating part which adds a sine-wave command to a torque command for the motor; a current feedback sampling part which obtains a current value of the motor; a speed feedback sampling part which obtains a speed feedback of the motor; an acceleration calculating part which calculates an acceleration value based on the speed feedback; and an estimated inertia calculating part which estimates the inertia of the article, based on a representative current value, a representative acceleration value and a torque constant of the motor, which are calculated from current and acceleration values in a plurality of cycles of the sine-wave command and stored in a sampling data storing part.

7 Claims, 4 Drawing Sheets

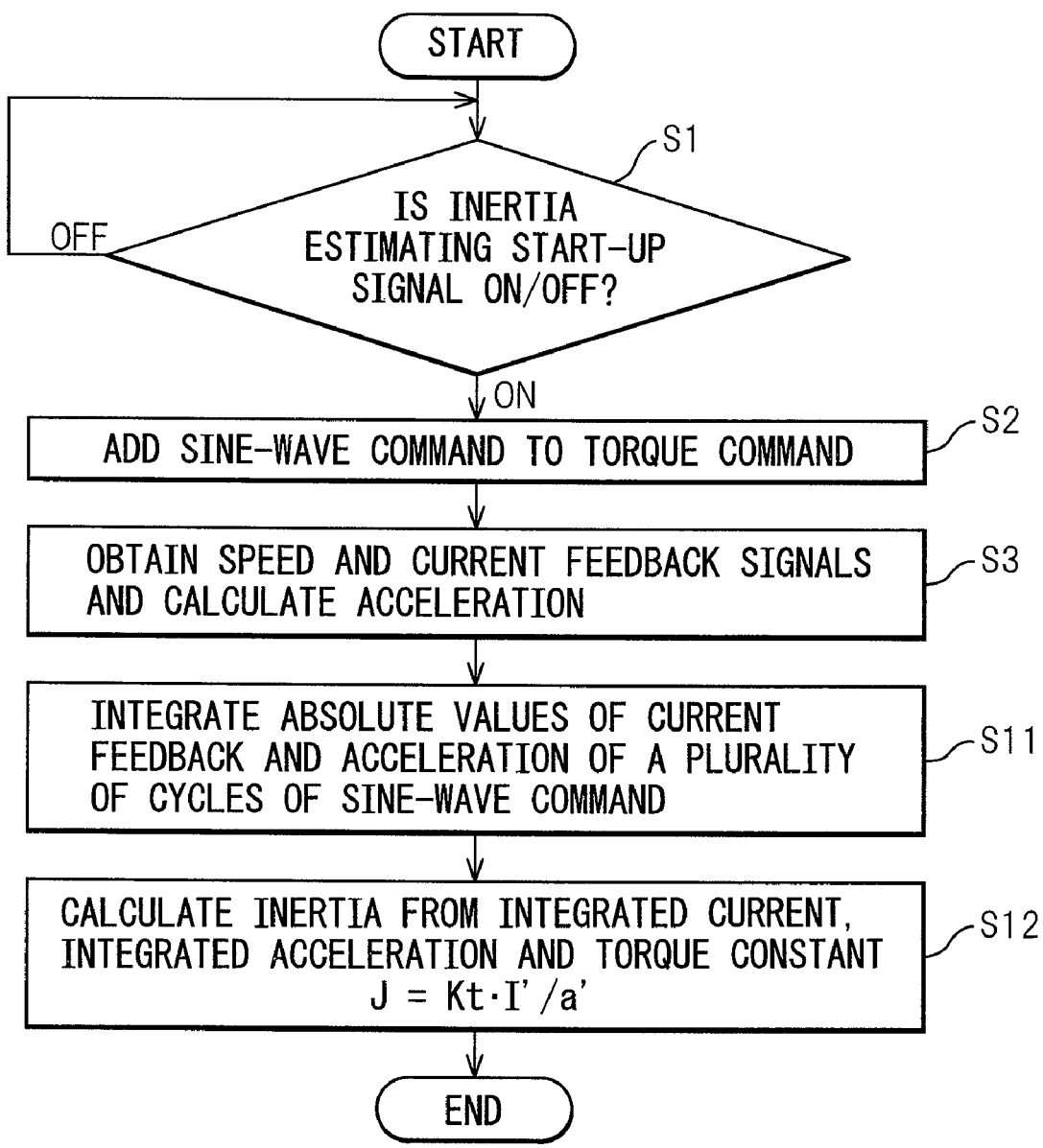

INERTIA ESTIMATING CONTROLLER AND CONTROL SYSTEM

RELATED APPLICATIONS

The present application claims priority from Japanese Patent Application No. 2008-320088, filed on Dec. 16, 2008, the entire content of which is fully incorporated herein by reference.

BACKGROUND OF THE INVENTION

1. Field of the Invention

The present invention relates to a controller and a control system for an electric motor, which drives a mechanical element of an industrial machine, such as a machine tool, and in particular, relates to a controller and a control system, which estimates the inertia of an article to be driven by the electric motor.

2. Description of the Related Art

In a machine tool or the like, it is important to know the inertia of an abject to be driven by an electric motor for determining a process condition or the like, and for controlling the motor with high accuracy. For example, when a time constant of an acceleration/deceleration command as the process condition is to be determined, it is advantageous to correctly know the inertia in order to stably control the motor and improve the accelerating/decelerating performance of the motor. Further, it is also advantageous to correctly know the inertia for calculating the responsiveness of the speed control in a control system.

However, it is not easy to determine the inertia of the article to be driven. For example, it is difficult to calculate the inertia of an article to be driven if the article has a complicated structure. In addition, if the inertia of the article driven by the electric motor varies due to attachment/detachment of a workpiece or the like, it is advantageous to know the inertia in each case. However, it is not easy to determine the inertia in a short period of time.

On the other hand, it is a known technique to calculate the inertia by using current feedback "I" and acceleration feedback "a" during operation of the motor. For example, inertia J can be calculated by the following equation where Kt is the torque constant of the motor.

$$J = I \cdot Kt / a$$

Japanese Unexamined Patent Publication No. 8-140386 discloses a method for estimating the inertia, in which an electric motor is activated by an acceleration/deceleration command and the inertia is estimated from a feedback signal during operation of the motor. Further, Japanese Unexamined Patent Publication No. 6-82346 discloses a method for estimating the inertia by a feedback signal during operation based on an arbitrary command.

The above prior art may include some improvements as described below.

The first improvement is the operation range and operation time required to estimate the inertia. As described in Japanese Unexamined Patent Publication No. 8-140386, when the inertia is estimated based on a feedback signal during operation of an electric motor by an acceleration/deceleration command, it is necessary to estimate the inertia after a generated torque is stable in relation to the acceleration/deceleration command. Therefore, it is necessary to operate the electric motor for a relatively long period of time. In particular, in a machine tool, the operation range of a drive axis may be limited, whereby it may be difficult to obtain the operation range sufficient to estimate the inertia. In addition, when a workpiece is frequently replaced with another, it may be difficult to obtain sufficient time for carrying out the particular operation required to estimate the inertia.

The second improvement is stability of controlling the electric motor during estimation of the inertia. In the inertia is measured after the inertia is changed by attaching a workpiece, it maybe difficult to stably control the motor by a control gain before the inertia is changed.

The third improvement is variability of estimating the accuracy of the inertia. As described in Japanese Unexamined Patent Publication No. 6-82346, when the inertia is estimated when an electric motor is operated by an arbitrary command, the estimating accuracy may be varied depending on the kind of operation.

The fourth improvement is influence of noise. When the inertia is estimated, current feedback or speed feedback is used, which includes some noise. Therefore, such noise may deteriorate the accuracy of the inertia.

SUMMARY OF THE INVENTION

The object of the present invention is to provide a controller and a control system for estimating the inertia, capable of improving at least one of the above four points.

According to one aspect of the present invention, there is provided a controller for an electric motor comprising: a current sampling part which obtains a current value of an electric motor; an acceleration calculating part which calculates an acceleration value of the electric motor; a sine-wave command generating part which generates a sine-wave command and adds the sine-wave command to a torque command for the electric motor; and an estimated inertia calculating part which estimates the inertia of an article to be driven by the electric motor, based on a representative current value, a representative acceleration value and a torque constant of the electric motor, wherein the representative current value and the representative acceleration value are obtained by the current value and the acceleration value included in a plurality of cycles of the sine-wave command.

In one embodiment, the estimated inertia calculating part estimates the inertia by using, as the representative acceleration value, an average value of the peak values in some cycles of the sine-wave command of the acceleration value, and an average value, as the representative current value, of peak values in some cycles of the sine-wave command of the current value.

In another embodiment, the estimated inertia calculating part estimates the inertia by using, as the representative acceleration value, an integrated value of absolute values in some cycles of the sine-wave command of the acceleration value, and an integrated value, as the representative current value, of absolute values in some cycles of the sine-wave command of the current value.

The controller may further comprise a speed sampling part which obtains a speed value of the electric motor, wherein the acceleration calculating part calculates the acceleration value based on the speed value obtained by the speed sampling part and a sampling cycle of the speed sampling part.

It is preferable that the frequency of the sine-wave command is higher than the band frequency of position control.

It is preferable that the frequency of the sine-wave command is lower than the band frequency of current control.

The controller may further comprise a position gain adjusting part which adjusts a position gain so that the band frequency of the position control is lower than the frequency of the sine-wave command when the sine-wave command is added to the torque command.

According to another aspect of the invention, there is provided a control system including the controller according to the present invention and a higher-level controller or external device, wherein the controller further comprises an estimated inertia sending part which sends data of the estimated inertia to the higher-level controller or the external device, wherein the higher-level controller or the external device comprises: an estimated inertia receiving part which receives the data of the estimated inertia; at least one of an optimum time constant calculating part which calculates an optimum value of a time constant of an acceleration/deceleration command for the electric motor based on the estimated inertia, an optimum speed gain calculating part which calculates an optimum value of a speed gain for the electric motor based on the estimated inertia, and a resonant frequency calculating part which calculates a mechanical resonant frequency based on the estimated inertia; and an optimum value sending part which sends at least one of the optimum time constant, the optimum speed gain and the resonant frequency to the controller, and wherein the controller comprises: an optimum value receiving part which receives at least one of the optimum time constant, the optimum speed gain and the resonant frequency; and an optimum value setting part which changes a setting of at least one of the time constant, the speed gain and attenuation frequency of a damping filter applied to the torque command of the controller.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 4 is a flowchart showing a modification of the inertia estimating process of FIG. 3.

DETAILED DESCRIPTION

Hereinafter, each embodiment of the present invention will be explained with reference to the drawings.

Figure 1:
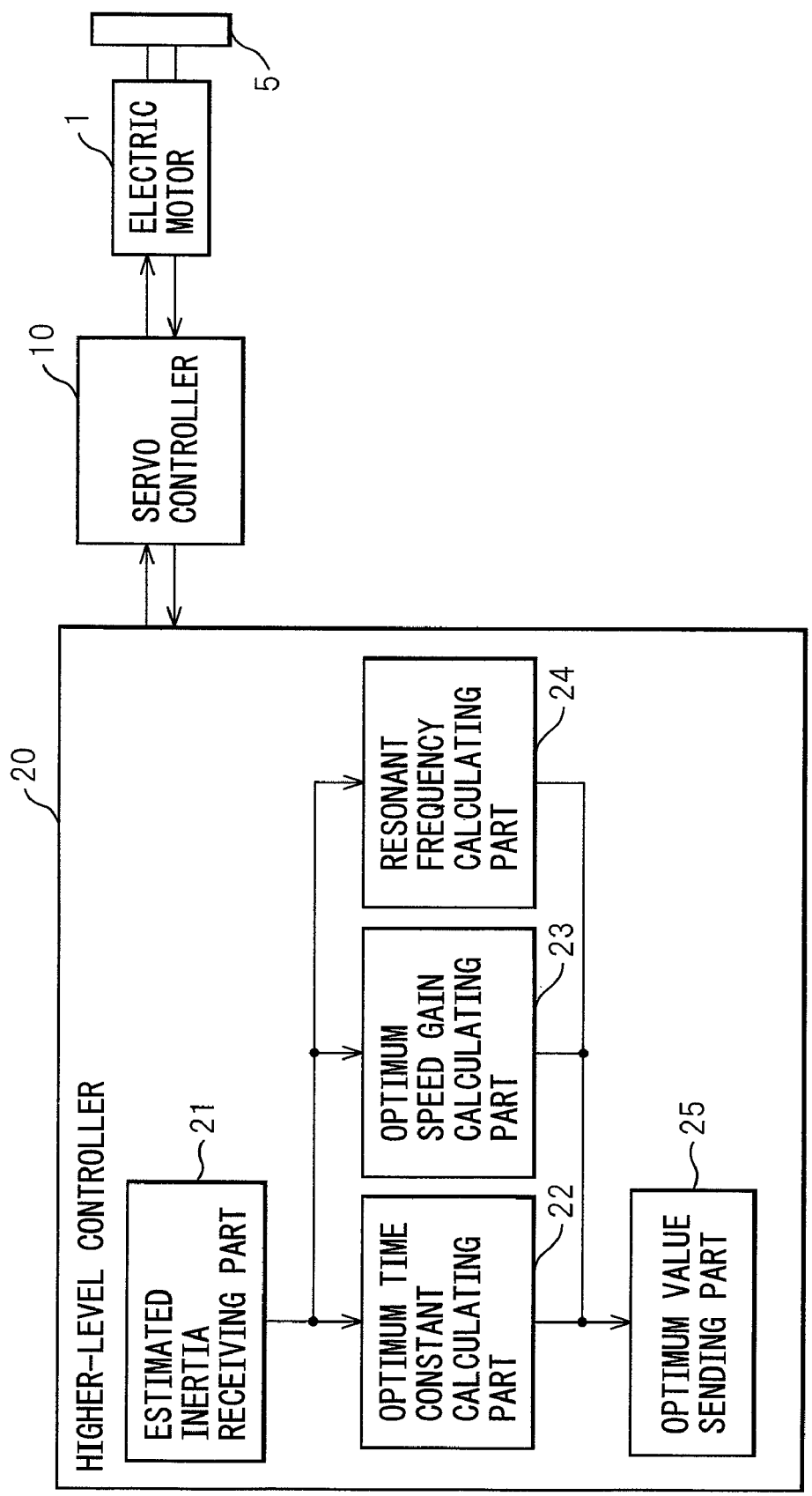
FIG. 1 is a block diagram of a control system according to one embodiment of the invention.

FIG. 1 is a block diagram of a control system according to an embodiment of the invention. As shown, an article to be controlled in this embodiment is an electric motor 5 which drives an article 5. Electric motor 1 may be used to, for example, change the position and/or the orientation of a table which holds a workpiece in a machine tool, or rotate a robot arm. Article 5 to be driven by electric motor 1 may include the table, the robot arm or the workpiece attached thereto. Further, article 5 may include a movable part of electric motor 1.

The position, a speed and a torque of electric motor 1 are controlled by a servo controller 10. To servo controller 10, a higher-level controller 20 or an external device, such as a CNC controller which outputs commands of the position, the speed and the torque of electric motor 1 depending on a working process, is connected. To higher-level controller 20, a plurality of servo controllers 10 may be connected.

Figure 2:
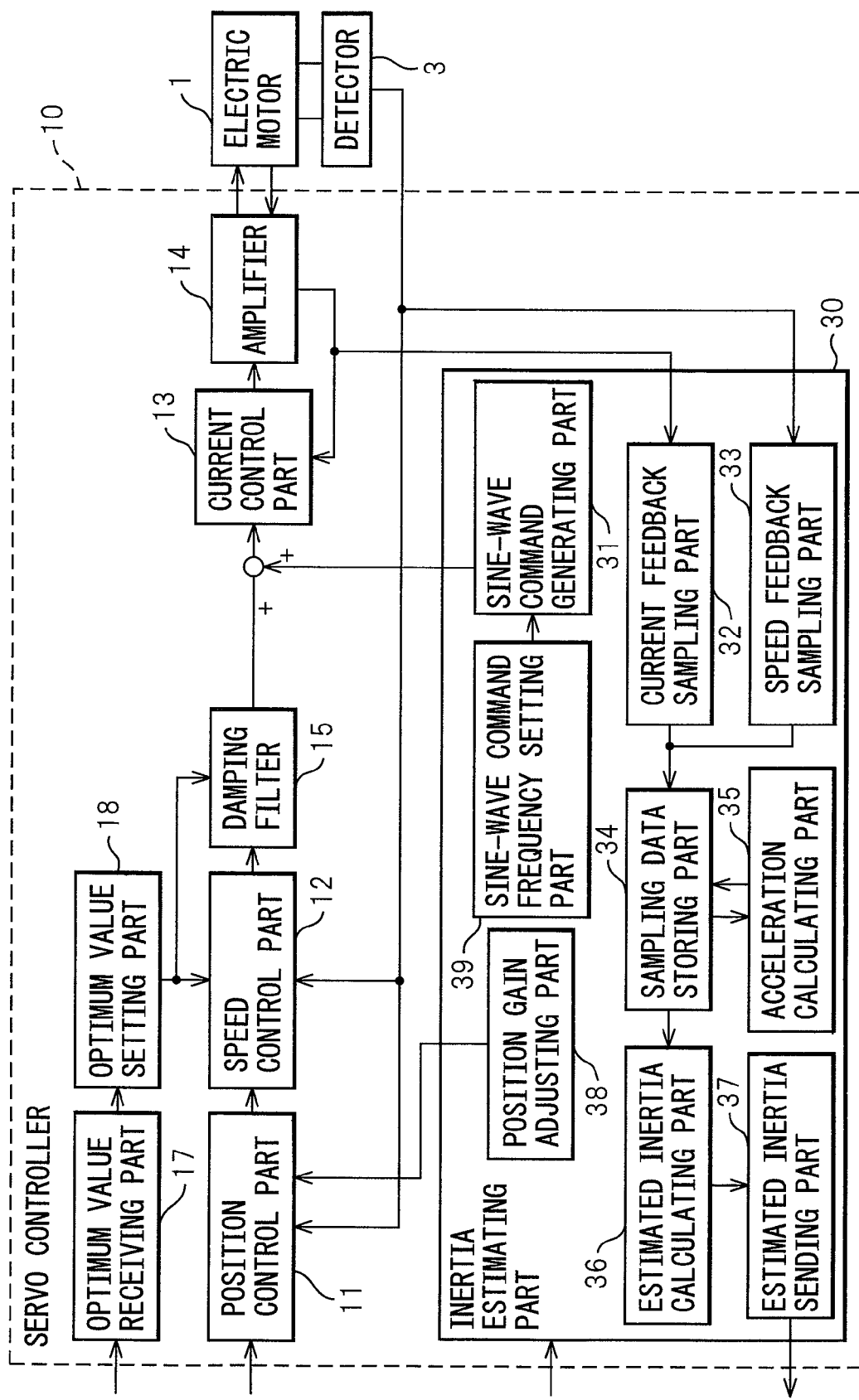
FIG. 2 is a block diagram showing a detailed constitution of a servo control part of the control system of FIG. 1.

FIG. 2 is a block diagram showing a detailed constitution of servo controller 10. As shown, servo controller 10 has a position control part 11, a speed control part 12, a current control part 13 and an amplifier 14. Position control part 11 and speed control part 12 activate corresponding to position and speed feedback signals from a detector 3 attached to electric motor 1, based on set position and speed gains. Current control part 13 activates corresponding to a torque command output from speed control part 12 and a current feedback signal form amplifier 14. An output from current control part 13 is input into amplifier 14, and then amplifier 14 controls power to be supplied to motor 1 based on the input signal. In addition, a damping filter 15 capable of attenuating a certain frequency of the torque command, such as a notch filter, is arranged in servo controller 10, in order to avoid mechanical resonance.

Servo controller 10 has an inertia estimating part 30. Into inertia estimating part 30, the speed feedback signal from detector 3 of electric motor 1 and the current feedback signal from amplifier 14 are input. Inertia estimating part 30 calculates the inertia of article 5 based on these signals. In addition, the current feedback signal means a q-phase current feedback, which is active current obtained by sampling three-phase current feedback of electric motor 1 (or a three-phase synchronous motor) and dq-converting a three-phase AC current value to a two-phase DC current value using phase-information of an encoder attached to motor 1.

FIG. 1 or 2 further discloses an estimated inertia receiving part 21 of higher-level controller 20 and a sine-wave command generating part 31 of inertia estimating part 30, the functions of which will be explained below. In addition, although each part of servo controller 10 and higher-level controller 20 is described as a discrete part for convenience sake, each part may not correspond to discrete hardware. In other words, each part may be realized by software in hardware having no clear segments. If each part is realized by software, each part may be constituted by discrete software, or another software having no clear segments.

Figure 3:
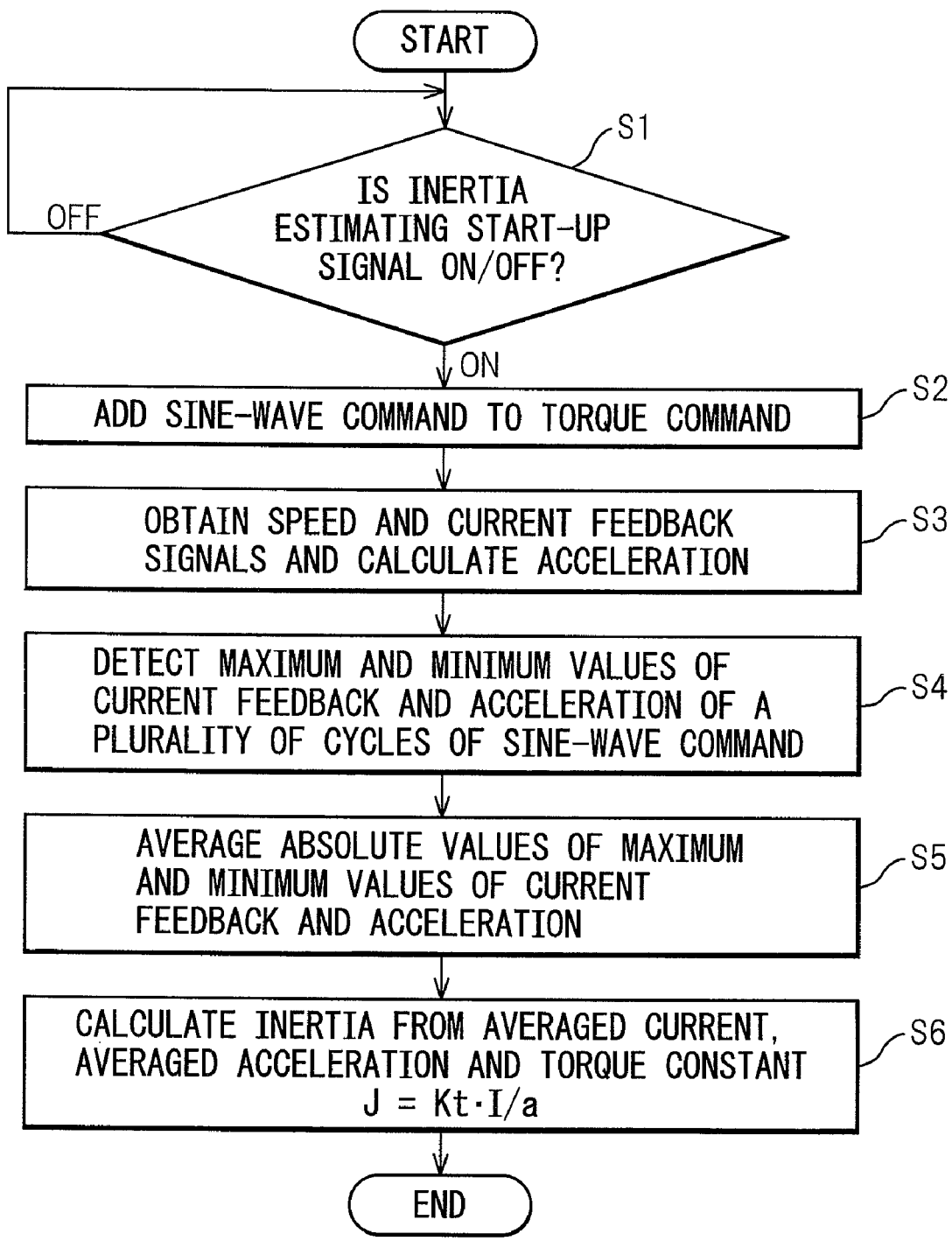
FIG. 3 is a flowchart showing an inertia estimating process in the control system of FIG. 1.

Next, with reference to FIG. 3, the estimating process in the control system of the invention will be explained. FIG. 3 is a flowchart showing the inertia estimating process in inertia estimating part 30.

Step S1 shows the process for waiting for a start-up command from higher-level controller 20 for the inertia estimating process. In other words, it is judged whether an inertia estimating start-up signal is ON or OFF in step S1. The timing of activating of the inertia estimating process may be predetermined in higher-level controller 20 by an operator, as one operation of each part corresponding to the process. Otherwise, higher-level controller 20 may automatically judge the timing when the inertia of article 5 is varied due to the attachment/detachment of the workpiece, and output of an activation command to activate the inertia estimating process.

When the activation command is input, in step S2, sine-wave command generating part 31 outputs a sine-wave command having a certain frequency, e.g., 10 Hz. The output sine-wave command is added to the torque command output from speed control part 12. At this point, it is preferable that a control command to output a constant torque command is given to speed control part 12. Due to this, the variability of estimating accuracy may be suitably controlled.

It is preferable that the frequency of the sine-wave command be higher than the band frequency of the position control (i.e., a response frequency in the position control; f [Hz]=position gain $[s^{-1}]/2\pi$) in servo controller 10. Due to this, interference due to position control part 11 may be avoided in relation to the sine-wave command.

Further, it is necessary that the frequency of the sine-wave command be lower than a band frequency of the current control. Concretely, when a transfer function of current control part 13 is represented by a standard secondary oscillating system as shown in following equation (1), an angular frequency $\omega_n$ corresponds to the band frequency of the current control. In this case, it is necessary that the frequency of the sine-wave command be lower than angular frequency $\omega_n$. Due to this, electric motor 1 may properly carry out cyclic action corresponding to the sine-wave command. In addition, in equation (1), an attenuation coefficient $\zeta$ is equal to $(1/2)^{1/2}(=0.71)$, and angular frequency $\omega_n$ is represented by $2^{1/2}/\sigma$ (wherein $\sigma$ is a time constant).

$$G(s) = \frac{\omega_n^2}{s^2 + 2\zeta\omega_n s + \omega_n^2} \tag{1}$$

Next, in step S3, a current feedback sampling part 32 and a speed feedback sampling part 33 of inertia estimating part 30 load current feedback signals and speed feedback signals at a certain sampling period T, respectively. Then, a sampling data storing part 34 stores the signals as current feedback values and speed feedback values. After that, an acceleration calculating part 35 calculates acceleration values based on the stored speed feedback data and the calculated acceleration values are stored in storing part 34. Concretely, acceleration value "a" may be calculated by following equation (2), using the difference between speed feedback value v(n) in the current sampling period and speed feedback value v(n-1) in the previous sampling period.

$$a=(v(n)-v(n-1))/T \tag{2}$$

Then, in step S4, among the stored current feedback values and acceleration values, maximum and minimum values are selected, in relation to a number of sampling periods (for example, twenty sampling periods) of the sine-wave command generated by sine-wave command generating part 31. In other words, by periodically changing the torque command value corresponding to the sine-wave command, maximum and minimum values of the current feedback values and the acceleration values may be selected in each cycle of the sine-wave. Then, the average values of the maximum and minimum values of the current feedback values are calculated as average $I_{max}$ and average $I_{min}$, respectively. Similarly, the average values of the maximum and minimum values of the acceleration values are calculated as average $A_{max}$ and average $A_{min}$, respectively. To be precise, in order to select the current feedback values and the acceleration values corresponding to the sine-wave command, if the torque command output from speed control part 12 is not zero, an influence due to this is corrected.

Next, in step S5, a representative current value and a representative acceleration value, for estimating the inertia as described below, are calculated. In the embodiment, as shown in following equation (3), an average current "I" is calculated, as the representative current value, by averaging absolute values of average $I_{max}$ and average $I_{min}$. Similarly, as shown in following equation (4), an average current "a" is calculated, as the representative acceleration value, by averaging absolute values of average $A_{max}$ and average $A_{min}$.

$$I=(|\text{average } I_{max}|+|\text{average } I_{min}|)/2 \tag{3}$$

$$a=(|\text{average } A_{max}|+|\text{average } A_{min}|)/2 \tag{4}$$

Next, in step S6, by using average current "I," average acceleration "a" and a torque constant Kt of electric motor 1, an estimated inertia J may be calculated, as shown in following equation (5). In addition, the processes of steps S4 to S6 may be executed in an estimated inertia calculating part 36.

$$J=Kt\cdot I/a \tag{5}$$

As such, the inertia estimating process is completed. After the inertia estimating process is completed, estimated inertia J is transmitted from an estimated inertia sending part 37 to an estimated inertia receiving part 21 of higher-level controller 20, as well as a signal indicating that the estimating process is completed. In higher-level controller 20, based on the received estimated inertia J, an optimum time constant calculating part 22, an optimum speed gain calculating part 23 and a resonant frequency calculating part 24 calculate an optimum time constant during acceleration/deceleration, an optimum speed gain, and a resonant frequency, respectively.

When the time constant of acceleration/deceleration is too small relative to the capacity of electric motor 1 and the inertia of article 5, the capacity of the motor cannot realize the commanded acceleration/deceleration, whereby the output torque of the motor is saturated in relation to the commanded torque, by which the motor cannot be suitably controlled. On the other hand, when the time constant is too large, the capacity of the motor cannot be fully exercised and acceleration/deceleration becomes too slow.

In the present invention, by properly adjusting the time constant of acceleration/deceleration based on the estimated inertia, electric motor 1 may realize maximal acceleration/deceleration corresponding to the capacity of the motor and the inertia. In optimizing the time constant of acceleration/deceleration, for example, an optimum time constant for a reference inertia is stored as a reference time constant. In this case, if estimated inertia J is twice as large as the reference inertia, an optimum time constant for the estimated inertia may be determined as a half value of the reference time constant. At this point, the reference time constant for the reference inertia may be predetermined theoretically or experimentally.

When a speed gain is too small relative to the inertia, the speed of electric motor 1 cannot follow the commanded value, whereby the stable control cannot be carried out. On the other hand, when the speed gain is too large relative to the inertia, vibration may occur.

Therefore, by optimally adjusting the speed gain based on the estimated inertia, the speed may be properly controlled at speed control part 12. In optimizing the speed gain, for example, an optimum speed gain for a reference inertia is stored as a reference speed gain. In this case, if estimated inertia J is twice as large as the reference inertia, an optimum speed gain for the estimated inertia may be determined as a twice value of the reference speed gain. At this point, the reference speed gain for the reference inertia may be predetermined theoretically or experimentally.

The optimum time constant and the optimum speed gain may be determined by a conventional method, for example, by approximating the relationship between the inertia and the time constant or the speed gain by a function, or by storing the relationship as a table data and interpolating the table data if required.

If mechanical resonance occurs in electric motor 1, the operation of the motor may be unstable. Therefore, as described above, servo controller 10 has damping filter 15 to avoid the resonance. At this point, the resonant frequency varies depending on the inertia of article 5. Concretely, resonant frequency $\omega_{r0}$ may be calculated by following equation (6), wherein Jm is the inertia of a movable part of electric motor 1, JL is the inertia of a rest part of article 5, and Ks is the torsional rigidity between the two parts.

$$\omega_{r0} = \sqrt{\frac{Ks}{JL}\left(1 + \frac{JL}{Jm_0}\right)} = \sqrt{\frac{Ks}{JL}(1 + R_0)} \quad (6)$$

By equation (6), the resonant frequency may be calculated by using estimated inertia J. At this point, inertia Jm of the movable part of electric motor 1 may be predetermined theoretically or experimentally, and inertia JL may be calculated based on inertia Jm and estimated inertia J. In addition, by adjusting the attenuation frequency of damping filter 15 based on change of the resonant frequency of corresponding to change of the inertia (for example, by coinciding the attenuation frequency to the resonant frequency), the resonance may be properly controlled.

The optimum time constant, the optimum speed gain and the resonant frequency, thus calculated in higher-level controller 20, are sent from an optimum value sending part 25 to an optimum value receiving part 17 of servo controller 10. Servo controller 10 has an optimum value setting part 18 which changes the settings of speed control part 12 and damping filter 15, based on the received time constant, speed gain and resonant frequency. In addition, these values may be utilized in setting a process and/or machining condition in higher-level controller 20.

In the embodiment as explained above, the sine-wave command is added to the torque command, and the inertia is estimated from the feedback signals during operation in a plurality of cycles of the sine-wave command. Due to this, the variability of estimating accuracy may be reduced between each estimating process, since the estimating process is executed using the feedback signals during the constant operation. Further, since the feedback signals in the plurality of cycles are used, the noise influence may be reduced by averaging the signals in the plurality of cycles.

In the present invention, it is not necessary to wait until the operation of the motor becomes stable, since the feedback signals in the periodic operation of the motor, not a feedback signal when the operation of the motor becomes stable, is used. Instead, in the invention, the reliability of the estimating process is assured by averaging the data in the plurality of cycles. However, since such an averaging needs mere several tens of cycles of the sine-wave command, for example, the estimating process may be properly executed in a relatively short period of time. Therefore, the time required for the estimating process is relatively short and the operation for the estimating process is the periodic operation corresponding to the sine-wave command, whereby the operation range required for the estimation is small.

Thus, the inertia may be estimated in a short period of time and by using the small operation range. Accordingly, the inertia may be rapidly and effectively whenever the inertia is varied, whereby the time constant of acceleration/deceleration, the speed gain and the attenuation frequency for avoiding the resonance may be properly set corresponding to the estimated inertia. Due to this, electric motor 1 may be properly controlled even if the inertia is varied. As a result, the processing accuracy of a machine tool using the electric motor may be improved.

The above embodiment is an exemplification of the present invention, thus various modification may be possible within the scope of the invention as specified by claims. For example, the optimum time constant, the optimum speed gain and the resonant frequency are calculated in higher-level controller 20 and set to servo controller 10. However, the calculation and setting of these values may be executed in another separated or external device.

In the above embodiment, the frequency of the sine-wave command is sufficiently higher than the band frequency of the position control. However, especially when the speed gain is low and the position gain is high, if a sine-wave command having a frequency near the band frequency of the position control is added, control of the motor may be unstable. On the other hand, in order to stabilize control of the motor, it is preferable to set the band frequency of the position control to or lower than one quarter of the frequency of the sine-wave command, when the inertia is estimated.

Then, when the inertia is estimated, a position gain adjusting part 38, which automatically adjusts the position gain so that the band frequency of the position control is changed to or lower than a quarter of the frequency of the sine-wave command, may be provided to inertia estimating part 30. For example, if the frequency of the sine-wave command is 10 [Hz], position gain adjusting part 38 automatically sets the position gain so that the band frequency of the position control is temporarily equal to or lower than 15.7 [s$^{-1}$] (=10 [Hz]·2π/4), when the inertia is estimated. Otherwise, a sine-wave command frequency setting part 39 may be provided to inertia estimating part 30. Sine-wave command frequency setting part 39 automatically sets a frequency, equal to four times frequency of the band frequency of the position control corresponding to the position gain, as the frequency of the sine-wave command.

In the above embodiment, in order to calculate the representative current and acceleration values for inertia estimating, the maximum and minimum values of the feedback signals in each cycle are selected and then averaged. However, the present invention is not limited to as such. For example, as the representative current and acceleration values, integrated values of absolute values of the feedback signals may be used. FIG. 4 shows a flowchart of such a modification of the inertia estimating process. In FIG. 4, the same number is added to a step which is similar to a step of FIG. 3.

In the modification of FIG. 4, in a step S11 following step S3, absolute values of the current value and the feedback values are calculated, and theses absolute values are integrated in a plurality of cycles of the sine-wave command. Then, in step S12, by using an integrated current value I', an integrated acceleration value a' and a torque constant Kt of electric motor 1, an estimated inertia is calculated by following equation (7). Also in this modification, by using the feedback values in the plurality of cycles of the sine-wave command, the variability of estimating accuracy may be reduced between each estimating process. Further, the noise influence may be reduced, and the inertia may be estimated with high accuracy.

$$J = Kt \cdot I'/a' \quad (7)$$

According to the servo controller of the invention, the inertia of the article to be driven may be properly estimated in a short period of time, without operating the electric motor at a long distance.

In the present invention, the inertia is estimated from the feedback signals (e.g., detected values of the current and/or the speed of the electric motor) while the electric motor performs the constant motion based on a certain sine-wave command. Therefore, the variability of estimating accuracy may be reduced between each estimating process. Further, since the feedback signals in the plurality of cycles are used, the noise influence may be reduced by averaging the signals in the plurality of cycles. In the invention, the feedback signals in the periodic operation of the motor are used to estimate the inertia, and the reliability of the estimating process is assured by averaging the data in the plurality of cycles. Therefore, the estimating process may be properly executed in relatively short time, for example, several tens of cycles of the sine-wave command. Further, during the estimating process, the motor performs the periodic operation corresponding to the sine-wave command, whereby the operation range required for the estimation is small.

In the present invention, in the relational equation $J=Kt \cdot I/a$, including current "I," acceleration "a," torque constant Kt of the electric motor and inertia J, the representative current and acceleration values are substituted into "I" and "a," respectively, whereby estimated inertia J may be obtained. Since the measured values in the same operation in the plurality of cycles are averaged, the noise influence may be reduced.

Due to the frequency of the sine-wave command, which is higher than the band frequency of position control, interference between the sine-wave command and the position control may be avoided.

Due to the frequency of the sine-wave command, which is lower than the band frequency of current control, the electric motor may be properly operated corresponding to the sine-wave command.

While the sine-wave command is added to the torque command, the position gain adjusting part may set the position gain so that the band frequency of the position control is lower than the frequency of the sine-wave command. Due to this, control may be stable while the sine-wave command is added.

The control system of the present invention includes the servo controller as described above, and the higher-level controller or the external device. The higher-level controller or the external device calculates at least one optimum value of the time constant of acceleration/deceleration and the speed gain of the electric motor, and the attenuation frequency of the damping filter applied to the torque command of the servo controller, and sets the optimum value to the servo controller. Due to such a control system, the time constant of acceleration/deceleration, the speed gain and/or the attenuation frequency may be rapidly and properly set whenever the inertia is varied. Therefore, the electric motor may be properly controlled even when the inertia is varied.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A controller for an electric motor comprising:
   an adding part which adds a sine-wave command to a torque command for the electric motor;
   a current obtaining part which obtains a current value of the electric motor;
   an acceleration obtaining part which obtains an acceleration value of the electric motor; and
   an estimating part which estimates the inertia of an article to be driven by the electric motor, based on a representative current value, a representative acceleration value and a torque constant of the electric motor,
   wherein the representative current value and the representative acceleration value are obtained by a plurality of the current values and a plurality of the acceleration values included in a same operation in a plurality of cycles of the sine-wave command.

2. The controller as set forth in claim 1, wherein the estimating part estimates the inertia by using, as the representative acceleration value, an average value of peak values in some cycles of the sine-wave command of the acceleration values, and an average value, as the representative current value, of peak values in some cycles of the sine-wave command of the current values.

3. The controller as set forth in claim 1, wherein the estimating part estimates the inertia by using, as the representative acceleration value, an integrated value of absolute values in some cycles of the sine-wave command of the acceleration values, and an integrated value, as the representative current value, of absolute values in some cycles of the sine-wave command of the current values.

4. The controller as set forth in claim 1, wherein a frequency of the sine-wave command is higher than a response frequency in position control.

5. The controller as set forth in claim 1, wherein a frequency of the sine-wave command is lower than a response frequency of position in current control.

6. The controller as set forth in claim 1, further comprising a setting part which sets a position gain so that a response frequency in the position control is lower than the frequency of the sine-wave command when the sine-wave command is added to the torque command.

7. A control system including the controller as set forth in claim 1 and a higher-level controller or external device,
   wherein the controller further comprises an inertia sending part which sends data of the estimated inertia to the higher-level controller or the external device,
   wherein the higher-level controller or the external device comprises:
      an inertia receiving part which receives the data of the estimated inertia;
      a calculating part which calculates an optimum value of at least one of a time constant of an acceleration/deceleration command for the electric motor, a speed gain for the electric motor and an attenuation frequency of a damping filter applied to the torque command of the controller; and
      an optimum value sending part which sends the optimum value to the controller,
   and wherein the controller comprises:
      an optimum value receiving part which receives the optimum value; and
      a changing part which changes a setting of at least one of the time constant, the speed gain and attenuation frequency.

* * * * *